(12) United States Patent
Mercer et al.

(10) Patent No.: US 12,038,135 B2
(45) Date of Patent: Jul. 16, 2024

(54) SMALL MOLECULE GAS STORAGE ADAPTER

(71) Applicants: Michael D. Mercer, Edmond, OK (US); Ronald R. Mercer, Nichols Hills, OK (US)

(72) Inventors: Michael D. Mercer, Edmond, OK (US); Ronald R. Mercer, Nichols Hills, OK (US)

( * ) Notice: Subject to any disclaimer, the term of this patent is extended or adjusted under 35 U.S.C. 154(b) by 0 days.

(21) Appl. No.: 18/119,649

(22) Filed: Mar. 9, 2023

(65) Prior Publication Data
US 2023/0213151 A1    Jul. 6, 2023

Related U.S. Application Data

(62) Division of application No. 17/301,871, filed on Apr. 16, 2021, now Pat. No. 11,680,684.

(51) Int. Cl.
*F17C 13/06* (2006.01)
*F17C 1/14* (2006.01)
*F17C 5/06* (2006.01)

(52) U.S. Cl.
CPC ............... *F17C 13/06* (2013.01); *F17C 1/14* (2013.01); *F17C 5/06* (2013.01); *F17C 2203/0646* (2013.01); *F17C 2205/0311* (2013.01); *F17C 2221/012* (2013.01)

(58) Field of Classification Search
CPC ...................................................... F17C 13/06
See application file for complete search history.

(56) References Cited

U.S. PATENT DOCUMENTS

| 2,066,517 | A | 1/1937 | Campbell |
| 2,332,462 | A | 10/1943 | Nilson |
| 3,196,622 | A | 7/1965 | Smith |
| 3,196,952 | A | 7/1965 | Solum |
| 3,205,665 | A | 9/1965 | Van Horn |
| 3,329,447 | A | 7/1967 | Hitz |
| 3,352,116 | A | 11/1967 | Waterman |

(Continued)

FOREIGN PATENT DOCUMENTS

| DE | 69505802 T2 | 4/1999 |
| EP | 1435481 A1 | 7/2004 |

(Continued)

OTHER PUBLICATIONS

KR200315889 English translation (Year: 2003).*

*Primary Examiner* — Jason L Vaughan
*Assistant Examiner* — Amanda Kreiling
(74) *Attorney, Agent, or Firm* — Hall Estill Law Firm (57) ABSTRACT

An apparatus in the form of a subterranean storage container configured to store a volume of a small molecular gas, such as hydrogen or methane. In some embodiments, a casing is arranged to extend into a subterranean formation. A top end of the casing is connected to a top cap structure. The top cap structure includes an adapter flange connected to an inner liner which extends within the casing and is separated therefrom by a circumferentially extending annulus. The annulus is configured to be filled with a fluid at a predetermined pressure. The fluid may be an uncompressible liquid such as propylene glycol. The small molecular gas is stored within an interior of the inner liner at a selected pressure, such as above 1000 pounds per square inch (psi).

20 Claims, 4 Drawing Sheets

(56) References Cited

U.S. PATENT DOCUMENTS

| | | | |
|---|---|---|---|
| 4,417,829 A | 11/1983 | Berezoutzky |
| 4,639,164 A | 1/1987 | Pugnale et al. |
| 4,676,528 A | 6/1987 | Gray |
| 4,805,445 A | 2/1989 | Grappe |
| 4,805,674 A | 2/1989 | Knowlton |
| 4,852,054 A | 7/1989 | Mastandrea |
| 5,207,530 A | 5/1993 | Brooks et al. |
| 5,333,465 A | 8/1994 | McBride |
| 5,577,862 A | 11/1996 | Christensen et al. |
| 6,209,638 B1 | 4/2001 | Mikolajczyk |
| 6,637,976 B2 | 10/2003 | Stanton |
| 6,840,709 B2 | 1/2005 | Dahlem et al. |
| 9,109,751 B2 | 8/2015 | Schimp |
| 9,127,812 B2 | 9/2015 | Ronchieri et al. |
| 9,562,646 B2 | 2/2017 | Wang et al. |
| 9,896,269 B2 | 2/2018 | Williams et al. |
| 10,002,683 B2 | 6/2018 | Muller et al. |
| 10,337,669 B2 | 7/2019 | Mercer et al. |
| 10,837,601 B2 | 11/2020 | Mercer et al. |
| 10,995,906 B1 | 5/2021 | Meheen et al. |
| 11,414,273 B2 | 8/2022 | Bilak et al. |
| 2008/0131258 A1 | 6/2008 | Liepold et al. |
| 2011/0274492 A1 | 11/2011 | Verma et al. |
| 2012/0104008 A1 | 5/2012 | DeNardo et al. |
| 2013/0336721 A1 | 12/2013 | McBride et al. |
| 2014/0161533 A1 | 6/2014 | Oates |
| 2015/0330569 A1 | 11/2015 | Fitzpatrick |

FOREIGN PATENT DOCUMENTS

| | | | |
|---|---|---|---|
| KR | 200315889 Y1 * | 1/2003 | |
| KR | 200315889 Y1 | 6/2003 | |

\* cited by examiner

SMALL MOLECULE GAS STORAGE ADAPTER

RELATED APPLICATIONS

The present application is a divisional of co-pending U.S. patent application Ser. No. 17/301,871 filed Apr. 16, 2021, the contents of which are hereby incorporated by reference.

SUMMARY

Some embodiments are generally directed to an apparatus in the form of a subterranean storage container configured to store a volume of a small molecular gas such as, but not limited to, hydrogen or methane.

In some embodiments, an apparatus includes a casing connected to a top cap structure. The top cap structure has an adapter flange connected to an inner liner. The inner liner is configured to extend within the casing and be separated therefrom by a circumferentially extending annulus. The annulus is configured to be filled with a fluid at a predetermined pressure, such as but not limited to propylene glycol.

In other embodiments, a subterranean gas storage container is configured to extend into a subterranean formation. The container includes an outer casing having an outer sidewall and a bottom cap structure. The outer sidewall is cylindrically shaped with a proximal end and an opposing distal end, and the bottom cap structure sealingly encloses the opposing distal end. An inner liner is disposed within the outer casing and has a first inner sidewall that is cylindrically shaped with a proximal end adjacent the proximal end of the outer sidewall and an opposing distal end adjacent the opposing distal end of the outer sidewall. The inner liner further has a second inner sidewall that transversely spans and seals the first inner sidewall. A top cap assembly includes an annular flange that sealingly interconnects the outer sidewall of the casing and the first inner sidewall of the inner liner. This defines a sealed interior storage space within the inner liner and a sealed annulus that extends between the inner liner and the outer casing. The sealed interior storage space is configured to store a small molecular gas at a first pressure, and the sealed annulus is configured to store a fluid at a different, second pressure.

These and other features and advantages of various embodiments can be understood from a review of the following detailed description in conjunction with a review of the accompanying drawings.

DETAILED DESCRIPTION

Embodiments of a gas storage assembly generally utilize an adapter to securely seal a casing to entrap small molecule gas, such as hydrogen, helium, and neon.

The volume of gases consumed for personal, commercial, and industrial purposes has increased over time and appears to continue to grow. The storage of fluids and some gases can be safely facilitated with a variety of storage materials and configurations, such as metals, ceramics, stone, and polymers. However, the storage of relatively small gas molecules poses a difficult challenge for short-term, and long-term, time periods as leaks and/or gas permeation can occur despite the presence of materials and seals that effectively store large molecule gases. The presence of pressure can further exacerbate the difficulties of storing small molecule gas due to the molecular construction of storage tanks, containers, and seals.

With these issues in mind, an adapter constructed and utilized in accordance with various embodiments can safely store small molecule gas in a tank/container under dynamic pressure over extended periods of time. The use of an adapter that safely stores small molecular gasses allows a tank/container that is suitable for storing large molecule gases to store gasses of nearly any molecular size. Efficient installation and utilization of a tank/container adapter to store gases with small molecule sizes under pressure allows older generation large molecule gas storage to be repurposed with minimal labor, time, and cost.

Figures 1, 2:
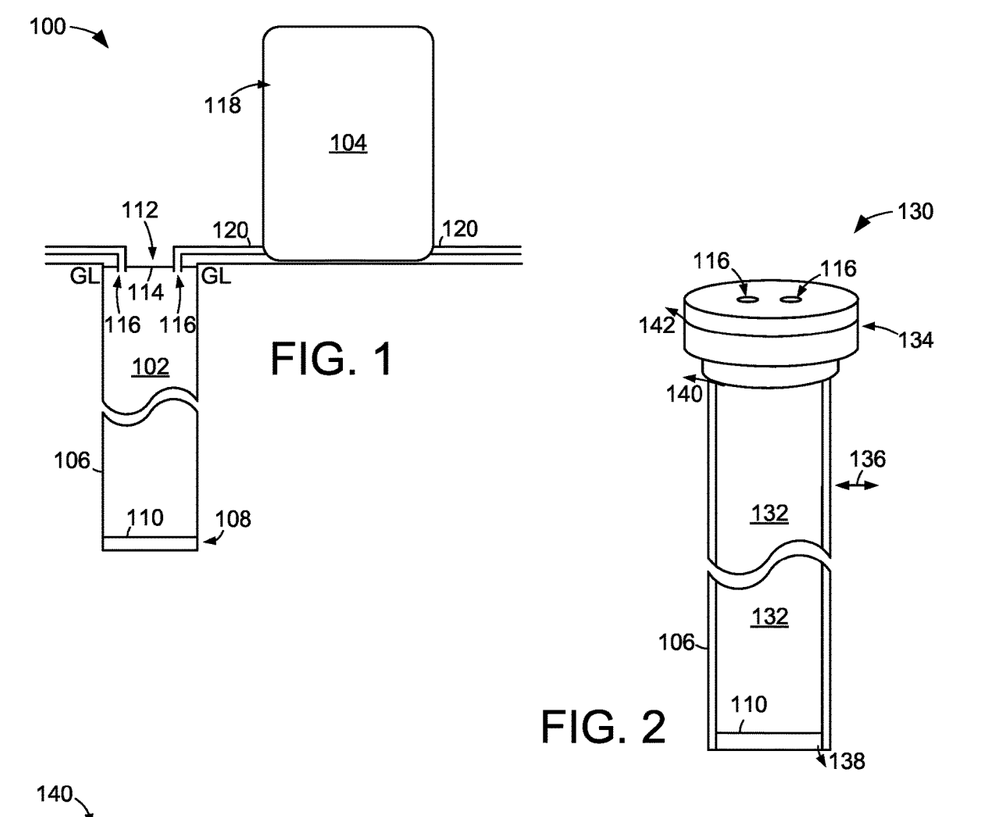
FIG. 1 represents portions of an example gas storage system in which various embodiments may be practiced.
FIG. 2 depicts a line representation of portions of an example gas storage container arranged in accordance with some embodiments.

FIG. 1 depicts portions of an example gas storage system 100 arranged with a subterranean gas storage container 102 and a gas storage tank 104. It is noted that a container is meant to be positioned partially, or completely, under a ground level (GL) while a tank is meant to be positioned wholly above the ground level. As shown, the gas storage container 102 is arranged to be wholly underground and continuously extending to a depth (D) into one or more subterranean formations.

The gas storage container 102 consists of at least one casing 106 that is sealed on the bottom 108 by a plug 110 and on the top 112 by a cap assembly 114. It is contemplated that multiple lengths of separate casing 106 are joined together to form the gas storage container 102 and extend to the predetermined depth, such as 50 feet or more, to allow gas storage under static, or dynamic, pressure, such as greater than 100 psi. The gas storage container 102 can have one or more ports 116 that allow piping/tubing to move gas into, and out of, the casing 106.

The gas storage tank 104 may be constructed of any type, number, and size of materials that form a sealed volume 118 accessed by gas transmission lines 120 to allow ingress, pressurization, and egress of various volumes of gas over time. Although the container 102 and tank 104 are not displayed with gauges, valves, and safety relief equipment, it is contemplated that the respective components 102/104 can be configured with one or more gas regulating, controlling, moving, pressurizing, and/or safety equipment. It is noted that the movement, pressurization, and storage of gas in the respective components 102/104 can be initiated, terminated, and controlled by one or more users positioned on site, which can be characterized as physically present with the components 102/104, or off site, which can be characterized as connected to the respective components 102/104 electronically.

FIG. 2 depicts a line representation of portions of an example gas storage container 130 that may be used as part of a gas storage system in combination with one or more other gas storage components. The gas storage container 130 defines a storage volume 132 defined by the interior, sealed aspect of the casing 106. A bottom plug 110, or bottom cap assembly 134, can establish a bottom container extent while a top cap structure 136 establishes a top container extent that provides gas transmission and pressurization.

While the materials and sealing components outlined in FIG. 2 are fully capable of storing conventional gases as well as small molecule gases, permeation into the materials by small molecule gases, such as Hydrogen, will accelerate fatigue through embrittlement and significantly shorten the service life of the storage. If embrittlement due to the storage of small molecule gas under pressure, such as above 1,000 psi, degrades the competency of the container 130 to the point of catastrophic failure, the release gas from a container 130 or from one or more locations about a container 130 can pose a serious hazard, particularly when flammable gases are being stored.

Figure 3:
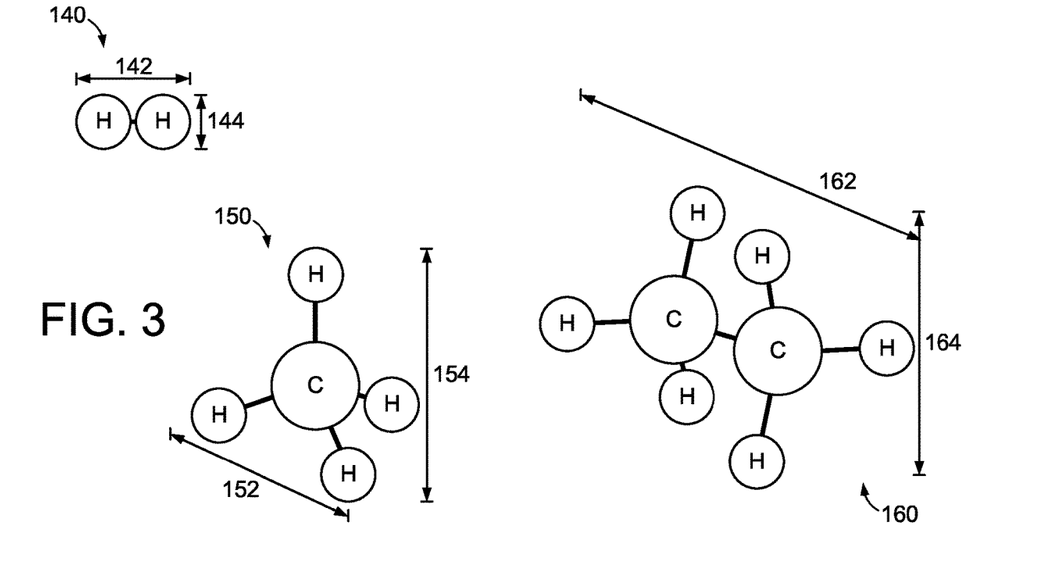
FIG. 3 conveys a line representation of gas molecules that may be stored in the gas storage system in accordance with assorted embodiments.

FIG. 3 displays molecular diagrams of assorted gases that can be stored in a gas storage container. An example molecule is $H_2$ 140, which has an atomic size and molecular configuration that is relatively small compared to other gases, such as methane 150 and ethane 160. Specifically, $H_2$ 140 has a length 142 and width 144 that defines a molecular area that is significantly smaller than the molecular area of methane 150, as defined by width 152 and height 154 measurements, or ethane 160, as defined by width 162 and height 164 measurements. While not drawn to scale, the molecules of FIG. 3 generally illustrate how storage of $H_2$ 140 can be more difficult than methane 150, ethane 160, or other natural gas hydrocarbons due to the relatively small size, particularly with regard to the material porosity of many gas storage casings, such as lead, steel, and iron.

Accordingly, various embodiments utilize an adapter to allow a typical casing 106, such as an oil well casing constructed of carbon steel or other steel alloys to be used to safely and reliably store gas with a relatively small molecular size, such as $H_2$.

Figures 4A, 4B, 4C:
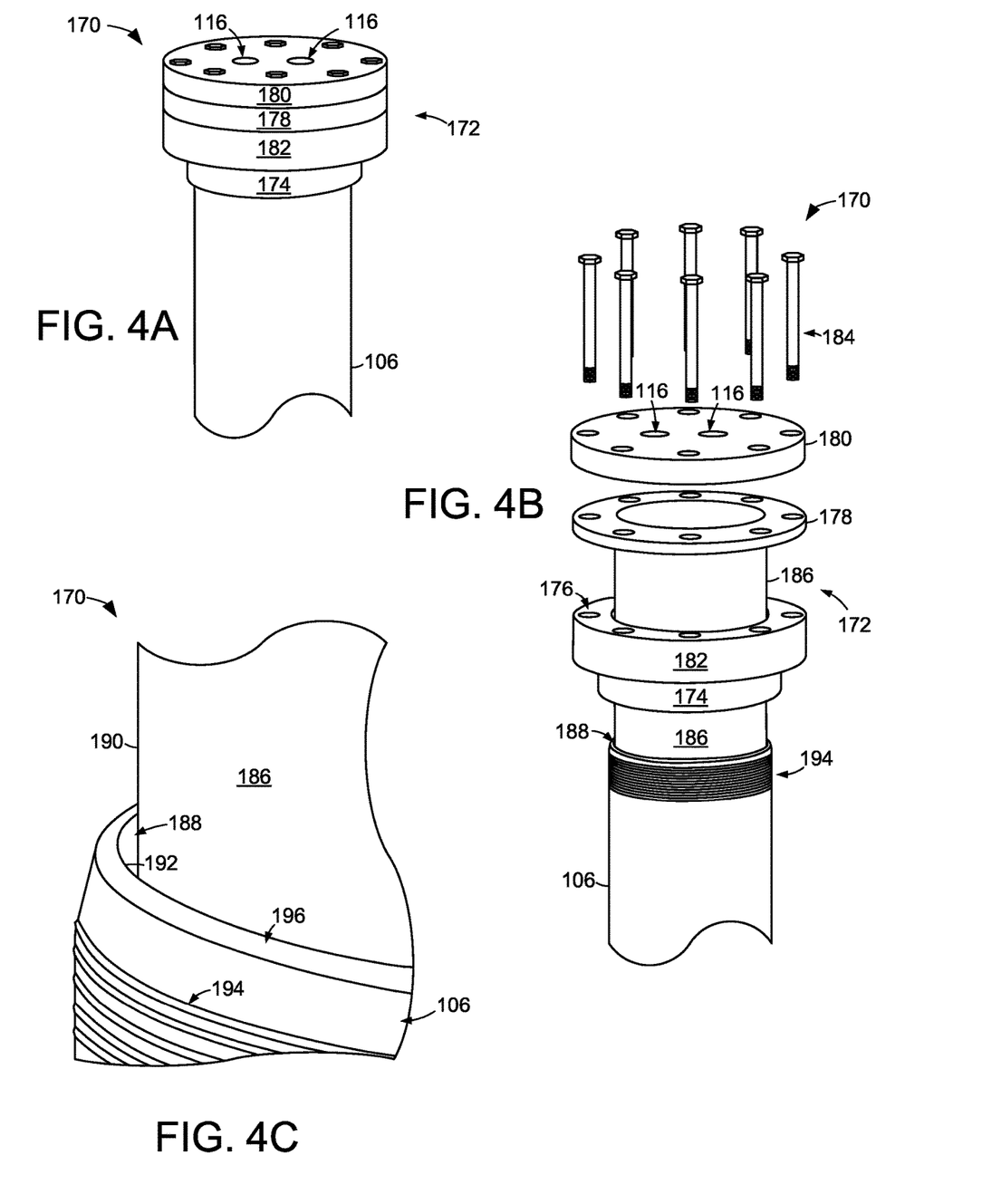
FIGS. 4A-4C respectively illustrate portions of an example gas storage assembly that can be utilized in accordance with various embodiments.

FIGS. 4A-4C respectively depict line representations of portions of an example gas storage container 170 configured and operated to store small molecule gas at relatively high pressures, such as over 1000 psi. The container utilizes a casing 106 that defines an interior volume along with a bottom plug or cap (not shown) and a top cap structure 172. The cap structure 172, in some embodiments, has a collar 174 that attaches to the casing 106 and presents a fastening surface 176 (FIG. 4B) for an adapter flange 178 and lid 180.

FIG. 4A illustrates how the cap structure 172 fits together, once assembled, with the adapter flange 178 sandwiched between an upper portion 182 of the collar 174 and the lid 180 (also sometimes referred to as an upper member or top member). The enlarged size of the upper portion 182 allows one or more fasteners 184 to extend through the cap structure 174 to form a gas tight assembly that is accessed via one or more ports 116.

The exploded view of FIG. 4B illustrates how the adapter flange 178 is connected to an adapter barrel 186 that defines an internal volume that is less than the volume of the outer casing 106. It is contemplated that the adapter barrel has a solid bottom that forms a water tight and air tight receptacle without installation of a plug, cap, lid, or cover onto the bottom of the barrel 186, opposite the flange 178. For reference, the outer casing 106 is also sometimes referred to as an outer liner, and the adapter barrel 186 is also sometimes referred to as an inner liner, or just a liner.

While not limiting, various embodiments construct the adapter flange 178 and barrel 186 of forged, cast, machined, or assembled material, such as aluminum, which exhibits low permeability to small molecules, such as $H_2$ and high resistance to embrittlement, which extends the life of the adapter. It is contemplated that some, or all, of the adapter 178/186 can be coated with one or more materials to lower gas permeability even more and/or increase rigidity, corrosion resistance, and fatigue resistance. Some embodiments coat different aluminum adapters with a polymer, rubber, ceramic, or graphene material to allow a casing 106 to employ an uncoated adapter or one of various adapters that exhibit different operational characteristics due to the respective coatings.

The adapter 178/186 is configured for installation into a casing 106 without adjusting or removing the casing 106 from its position, whether partially or completely underground. It is contemplated that the adapter 178/186 can be utilized in above ground gas storage tanks. The size and shape of the adapter barrel 186 relative to the casing 106 produces an annulus 188 of empty space extending between the casing 106 and barrel 186 along the entirety of the barrel sidewalls 190 (FIG. 4C). That is, an annulus 188 can be measured as the distance from an interior sidewall 192 of the casing 106 to a barrel sidewall 190. The annulus 188 allows the adapter barrel 186 to be installed, and removed, from the casing 106 without damaging the adapter barrel 186 and provides space for a damping material to be placed between the casing 106 and barrel 186.

In the close-up line representation of the annulus 188 in FIG. 4C, the threads 194 of the casing 106 are shown, which interact with matching threads of the collar 174 to mate a casing sealing surface 194 with the collar 174 via a metal-to-metal connection. In other words, the casing 106 is configured with threads 194 that flow into a tapered surface 196 that defines a sealing surface 196 that is brought into contact with the collar 174 to form a gas tight seal. While one or more sealing materials can be introduced between the collar 174 and casing 106, assorted embodiments machine the collar 174 and casing sealing surface 194 to tolerances that provide a gas and/or fluid tight seal strictly with a metal-to-metal connection.

Figure 5:
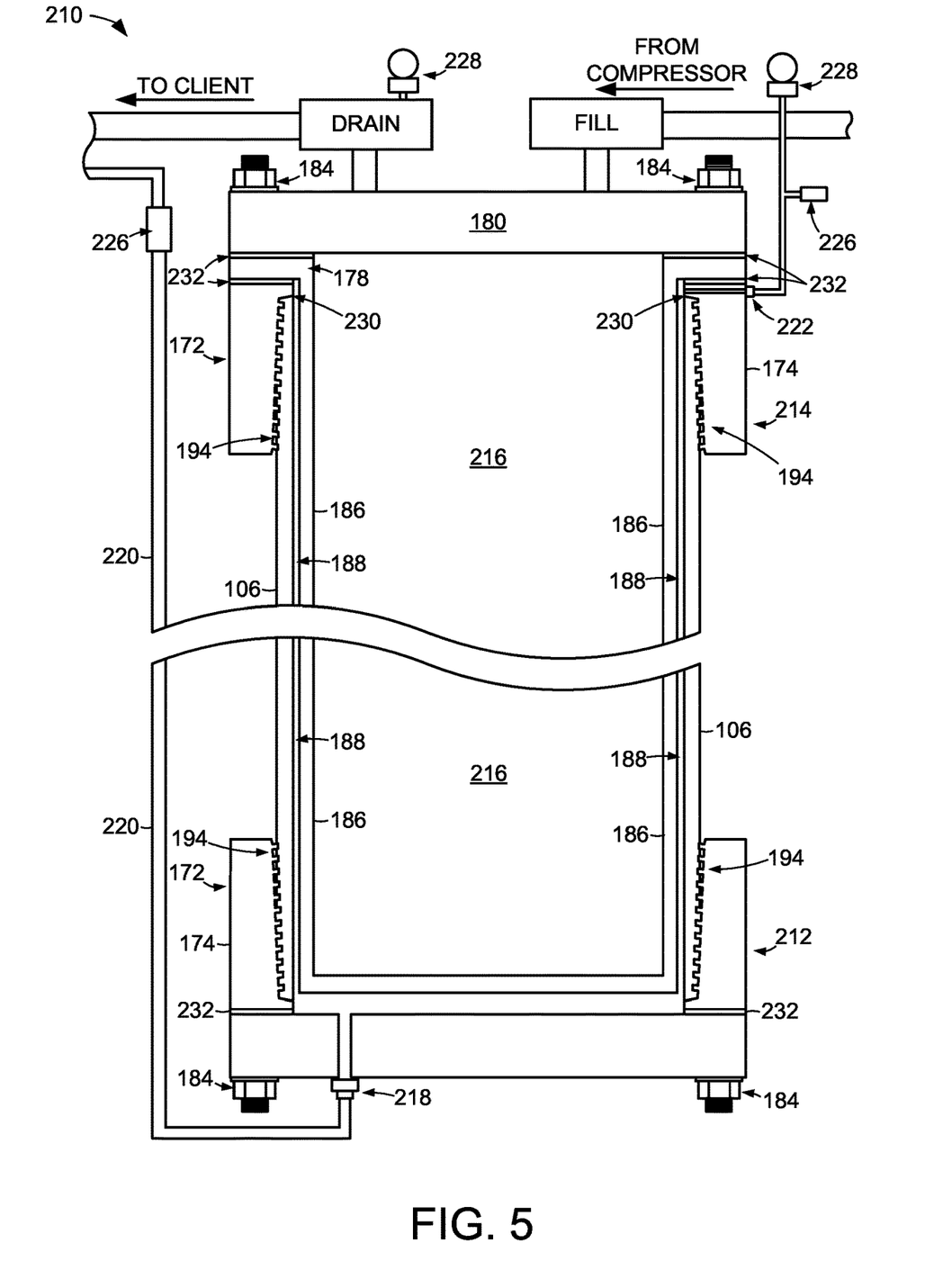
FIG. 5 depicts portions of an example gas storage assembly configured and operated in accordance with some embodiments.

FIG. 5 depicts a cross-sectional line representation of portions of an example gas storage container 210 arranged in accordance with various embodiments. The container 210 employs a casing 106 with first threads 194 positioned to secure a bottom cap 212 to a first region while second threads 194 secure a top cap 214 to a second region. It is noted that some embodiments utilize one or more plugs to seal a bottom of the casing 106 while other embodiments employ matching cap structures 212/214 that thread a collar onto the casing 106 and secure a lid onto the collar via fasteners, as illustrated in FIGS. 4A-4C.

Although the cap structures 212/214 may having matching configurations, the cap structure 212/214 located at the top portion of the casing 106 secures the adapter flange 178 between the collar 174 and lid 180 to ensure the adapter 178/186 does not inadvertently move or get ejected from the casing 106. The secure position of the adapter 178/186 defines the annulus 188. While the annulus 188 may be kept empty, or in a vacuum pressure differential, the cyclic filling and removing of gas within the adapter internal volume 216 can cause at least the adapter barrel 186 to expand and contract. Such barrel 186 movement can cause fatigue to the barrel 186 material as well as damage to the sidewalls of the casing 106 and/or barrel 186. Hence, some embodiments fill the annulus 188 with damping that reduces the expansion and contraction of the barrel 186 material in response to pressurization and depressurization of the internal volume 216.

The annulus 188, in various embodiments, is filled with a propylene glycol and brought to a constant pressure, such as 10 psi. Although other materials, and combinations of materials, can be used to fill the annulus 188, propylene glycol has an extremely low freezing point, low compressibility, and is compatible with corrosion inhibitors while being environmentally friendly. As the annulus 188 represents a finite and relatively uncompressible volume of glycol, pressure exerted on the barrel 186 is transferred to the outer casing 106 with minimal expansion of the barrel 186. As a result, fatigue and physical damage to the barrel 186 due to expansion and contraction of cyclic pressurizations are managed to meet, or exceed, the rate of deterioration due to embrittlement over time. The adapter and lid 180, in some embodiments, are sacrificial and are replaced according to a predetermined schedule that maintains a margin of safety for the container and extends the service life of the outer casing 106 and cap assemblies indefinitely.

While the adapter barrel 186 fits inside the casing 106, the vacuum pressure of the annulus 188 and bottom of the casing 106 can make removal difficult. To accommodate a more efficient removal, the annulus 188 is plumbed to one or more fill ports 218 that can be positioned in a bottom cap structure 172, as shown, or other locations that provide access to the annulus 188 from outside the casing 106. It is noted that positioning the fill port 218 at the bottom-most extent of the annulus 188, casing 106, and container 210 allows the annulus to be efficiently filled and drained with liquid, as opposed to a side positioned port that would potentially not drain some annulus liquid without high pressure. The annulus fill port 218 is connected to at least one feed line 220 that allows for the ingress, egress, and pressurization of the gas/fluid with respect to the annulus 188.

The annulus fill port 218 can be complemented by one or more annulus monitor port 222 that may be positioned anywhere on the casing 106, but in some embodiments extends through a top collar 174, as shown in FIG. 5. A bleed line 224 allows pressure, gas, and/or fluid to be released upon selection of a valve 226. The bleed line 224 further allows one or more gauges 228 to monitor conditions of the annulus 188, such as pressure, humidity, and temperature. Use of one or more ports 218/222 that access the annulus 188 allows the adapter 178/186 to be hydraulically pumped into position within the casing 106, which alleviates difficulties associated with purely mechanical, or pneumatic, adapter 178/186 installation.

For instance, incompressible fluid can be pumped into, and out of, the annulus 188 to draw the adapter 178/186 into, or out of, the casing 106. As a result, the annulus 188 can be used to aid adapter 178/186 installation and removal, which allows for different adapters 178/186 to be utilized for a container 210 over time to accommodate different gas storage conditions and capabilities. The monitoring of one or more annulus ports 218/222 provides data that can be used to determine the real-time current annulus gas/fluid condition. That is, pressure, and other environmental conditions in the annulus 188, can be tracked over time to calculate at least the volume, compressibility, density, and relative pressure of the gas/fluid in the annulus 188. Such annulus 188 conditions can be used to schedule proactive and/or reactive maintenance that serves to maintain the annulus 188 so that charging and discharging of gas in the adapter internal volume 216 does not induce more than minimal fatigue, corrosion, and mechanical war on the adapter 178/186.

Some embodiments utilize only metal-to-metal seals to create a gas, or fluid, tight enclosure with the container 210, as conveyed in FIG. 4C and shown by the casing/collar interactions 230 of FIG. 5. Other embodiments can complement metal-to-metal seals of the casing/collar with one or more metal or non-metal gaskets 232, such as cork, rubber, polymer, ceramic, and synthetic materials capable of sealing at working pressures. The use of one or more gaskets 232 in a cap structure 172 can be changed over time and allow the container 210 to provide optimal small molecule gas storage over a diverse range of temperatures and pressures.

Figure 6:
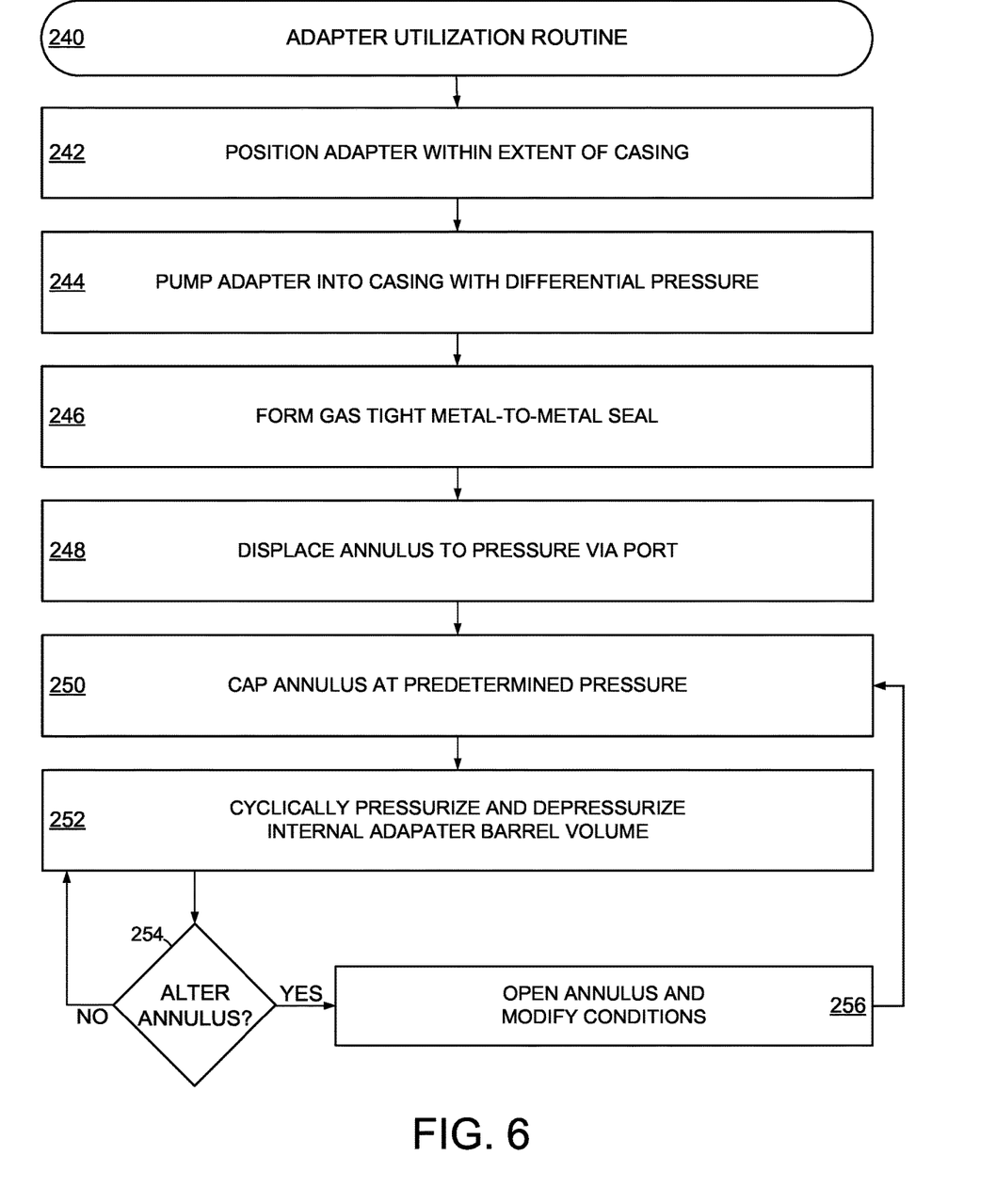
FIG. 6 is an example gas storage assembly installation routine that can be executed with the various embodiments of FIGS. 1-5.

FIG. 6 conveys a flowchart of an example adapter utilization routine 240 that can be executed with assorted embodiments of FIGS. 1-5 to provide gas storage for gases that have relatively small molecular size. The presence of a hollow, unfilled casing allows step 242 to begin the process of installing a single small molecule adapter into the casing. It is contemplated that the casing is constructed of a material, such as steel alloy, iron, or lead, that is not conducive to small molecule gas storage due to susceptibility to embrittlement. As such, the adapter can be constructed of a dissimilar material than the casing, such as aluminum, ceramics, and nanocomposites, that provides superior resistance to embrittlement than the casing.

Once the storage volume is depressurized and the lid 180 of the cap assembly is removed, the adapter is positioned over the hollow casing in step 242. Insertion of the adapter begins in step 244 and can involve using suction on the annular fill line 220 to pull the adapter into the casing until an adapter flange 178 contacts a cap structure collar 174, as illustrated in FIGS. 4A & 5. Once the adapter flange 178 is seated on the structure collar 174, the lid 180 is secured in place, which seals both the annulus 188 and the interior volume 216 of the adapter while isolating the annulus 188 from the interior volume 216.

The metal-to-metal seal may be complemented by one or more gaskets 232 positioned between the adapter flange, collar, and lid, The gas tight seal 230 and the gasket 232 between the collar 174 and the adapter flange 178 seal the annulus 188. The gasket 232 between the lid 180 and the adapter flange 178 seals the small molecule gas within the volume of the adapter 216 at pressures over 1000 psi.

With the annulus formed after the top cap structure has been assembled and secured so that the adapter flange is locked in place along with the adapter barrel, the volume of the annulus is displaced in step 248 by pumping a fluid or gas with low compressibility, such as propylene glycol down the annular fill line 220 and venting the volume of the annulus out the annular bleed valve 226. Once displaced, the bleed valve 226 is closed and the annulus is pressurized to a predetermined relative pressure, such as 10 psi, and the annulus drain/fill port is closed in step 250 and the annulus has a static condition until the adapter barrel expands and contracts to induce force and/or pressure on the annulus. It is noted that while the annulus drain/fill port remains closed during gas storage operations within the adapter barrel, the annulus monitor port can remain open to one or more gauges or be selectively opened with valving to allow at least annulus pressure to be detected.

Next, step 252 cyclically fills the internal chamber of the container, as defined by the adapter barrel, to a predetermined pressure and volume of gas before depressurizing the internal chamber as pressurized gas is released from the container. It is contemplated that the internal chamber is pressurized to a common pressure cyclically in step 252 or dynamic pressures are utilized over time depending on environmental conditions and/or desired amount of gas to be stored. Step 252 may be conducted for any amount of time with any number of gas fills/drains being conducted and associated with the internal chamber of the adapter barrel being pressurized and depressurized.

At any time, a user/operator of the container can evaluate in decision 254 to alter the annulus. If an annulus modification is in order, such as in response to a change in pressure of the annulus or a desire for a different compressibility value for the annulus, step 256 opens the annulus drain/fill port 220 and displaces the volume of the annulus out the bleed valve, which replaces the damping material of the annulus and repressurizing the annulus to different operating conditions. Some embodiments of step 256 simply fill and/or repressurize the annulus without displacing the annulus with new damping material/fluid. At the conclusion of the modification(s) to the annulus in step 256, the annulus is capped by returning to step 250.

In the event no annulus alteration is necessary from decision 254, the routine 240 returns to step 252 and the cyclical use of the internal chamber of the adapter barrel for the storage, and dispensing, of gas at a predetermined pressure, such as above 1000 psi. Through the use of the monitored and controlled annulus, along with the resistance to embrittlement of the adapter barrel compared to the outer casing, gas can be reliably stored and dispensed over time without material fatigue, corrosion, and leakage. The ability to interchange adapter barrels without modifying or moving an outer casing extends the service life of the container and allows for efficient alteration of the gas storage capabilities and performance of a gas storage container with minimal equipment and manpower.

What is claimed is:

1. An apparatus comprising a casing connected to a top cap structure, the top cap structure comprising an adapter flange connected to an inner liner, the inner liner configured to extend within the casing and be separated therefrom by a circumferentially extending annulus, the annulus filled with a noncompressible, non-hardening liquid at a predetermined pressure to support the inner liner responsive to filling of the inner liner with a small molecule gas at a storage pressure, the liquid transferring a compressive load from the inner liner to the casing.

2. The apparatus of claim 1, wherein the top cap structure further comprises a collar that threadingly engages the casing, the collar sealingly coupled to the adapter flange to form a fluid-tight seal therebetween.

3. The apparatus of claim 1, further comprising a sealing member formed of a non-metal material that engages a sealing surface of the adapter flange to form a fluid-tight seal between the sealing member and the sealing surface of the adapter flange.

4. The apparatus of claim 1, wherein the casing is cylindrically shaped having opposing proximal and distal ends, the top cap structure affixed to the proximal end of the casing, the apparatus further comprising a bottom cap structure sealingly affixed to the distal end of the casing.

5. The apparatus of claim 4, wherein the inner liner has a first sidewall that is cylindrically shaped with opposing proximal and distal ends, the proximal end of the first sidewall affixed to the adapter flange and the proximal end of the casing, the inner liner further having a second sidewall affixed to and spanning the distal end of the first sidewall to enclose an interior space within the inner liner configured to enclose the small molecule gas, the annulus further extending between a lowermost portion of the inner liner and the bottom cap structure.

6. The apparatus of claim 1, wherein the casing extends in a vertical direction into a subterranean formation.

7. The apparatus of claim 1, wherein the liquid comprises propylene glycol.

8. The apparatus of claim 1, wherein the casing is formed of a first rigid metallic material, and wherein the inner liner is formed of a different, second rigid metallic material.

9. The apparatus of claim 1, wherein the top cap structure further comprises an upper member that compressingly engages the adapter flange, the upper member comprising a first port coupled to an interior storage space defined by the inner liner to facilitate at least a selected one of ingress or egress of pressurized gas into or out of the interior storage space.

10. The apparatus of claim 1, wherein the inner liner comprises an interior facing, cylindrically shaped sidewall surface coated with a coating material configured to reduce at least a selected one of permeability, brittleness or corrosion of the inner liner.

11. A subterranean gas storage container configured to extend into a subterranean formation, comprising:
an outer casing comprising an outer sidewall and a bottom cap structure, the outer sidewall being cylindrically shaped with a proximal end and an opposing distal end, the bottom cap structure sealingly enclosing the opposing distal end;
an inner liner disposed within the outer casing and comprising a first inner sidewall that is cylindrically shaped with a proximal end adjacent the proximal end of the outer sidewall and an opposing distal end adjacent the opposing distal end of the outer sidewall, the inner liner further comprising a second inner sidewall that transversely spans and seals the first inner sidewall;
a top cap assembly comprising an annular flange that sealingly interconnects the outer sidewall of the casing and the first inner sidewall of the inner liner to define a sealed interior storage space within the inner liner and a sealed annulus that extends between the inner liner and the outer casing, the sealed interior storage space configured to store a small molecular gas at a first pressure; and
a volume of noncompressible, non-hardening liquid in the sealed annulus at a different, second pressure to flowingly support the inner liner by transferring a compressive force from the inner liner to the outer casing, and to facilitate subsequent removal of the inner liner from the outer liner using a pump.

12. The container of claim 11, wherein the small molecular gas comprises hydrogen gas and the fluid comprises glycol.

13. The container of claim 11, wherein the first inner sidewall of the inner liner comprises an interior facing cylindrical surface coated with a coating material configured to reduce at least a selected one of permeability, brittleness or corrosion of the inner liner.

14. The container of claim 11, wherein the top cap assembly further comprises a collar that threadingly engages the outer casing, the collar sealingly coupled to the adapter flange to form a fluid-tight seal therebetween.

15. The container of claim 11, further comprising a sealing member formed of a non-metal material that engages a sealing surface of the adapter flange to form a fluid-tight seal between the sealing member and the sealing surface of the adapter flange.

16. The container of claim 11, wherein the inner liner is formed of a metal configured to have low permeability to hydrogen.

17. The container of claim 11, further comprising a plurality of threaded fasteners that pass through an upper member to secure the flange adapter to the outer casing.

18. The container of claim 11, wherein the outer casing is formed of a first rigid metallic material, and wherein the inner liner is formed of a different, second rigid metallic material.

19. The container of claim 11, wherein the top cap structure further comprises a first port coupled to an interior storage space defined by the inner liner to facilitate at least a selected one of ingress or egress of the small molecular gas into or out of the sealed interior storage space.

20. The container of claim 11, wherein the small molecular gas stored in the sealed interior storage space is hydrogen at a pressure greater than 1000 pounds per square inch (psi).

* * * * *